United States Patent [19]

Schaeffer

[11] 3,994,509

[45] Nov. 30, 1976

[54] PROPULSION MEANS FOR WHEELCHAIRS

[76] Inventor: Jerome E. Schaeffer, 3717 W. 103rd St., Bloomington, Minn. 55431

[22] Filed: Jan. 28, 1976

[21] Appl. No.: 653,097

[52] U.S. Cl. ........................ 280/242 WC; 280/243; 280/244

[51] Int. Cl.² ........................ B62M 1/14

[58] Field of Search ............ 280/234, 242 WC, 243, 280/244, 246, 211; 297/DIG. 4

[56] References Cited

UNITED STATES PATENTS

| | | | |
|---|---|---|---|
| 390,174 | 9/1888 | Lambert | 280/246 |
| 616,021 | 12/1898 | Schaibly | 280/244 X |
| 654,896 | 7/1900 | Krueger | 280/242 WC |
| 827,243 | 7/1906 | Larson | 280/246 X |
| 838,228 | 12/1906 | Williams | 280/244 X |
| 1,058,123 | 4/1913 | Whitaker | 280/244 X |
| 1,332,819 | 3/1920 | Eklund | 280/246 |
| 3,701,543 | 10/1972 | Clark | 280/234 |

FOREIGN PATENTS OR APPLICATIONS

| | | | |
|---|---|---|---|
| 64,807 | 9/1946 | Denmark | 280/244 |
| 1,039,775 | 10/1953 | France | 280/246 |
| 19,694 | 7/1914 | United Kingdom | 280/244 |
| 16,687 | 10/1893 | United Kingdom | 280/246 |

*Primary Examiner*—Philip Goodman
*Assistant Examiner*—Terrance L. Siemens
*Attorney, Agent, or Firm*—Burd, Braddock & Bartz

[57] ABSTRACT

A propulsion means for wheelchairs includes two drive assemblies, one mounted at each side of a wheelchair. Each drive assembly includes an axle which is rotationally oscillated by pumping a drive lever pivotally mounted on and engaged with said axle. Two overrunning clutches are also mounted on said axle: one clutch disposed to engage when the axle is rotated in a clockwise direction, and the other disposed to engage when the axle is rotated counterclockwise. A chain, connected to a ground wheel, is connected to one clutch and then the other through a reverse bend in said chain, so that the oscillatory motion of said axle is transmitted through said chain to cause unidirectional rotational motion in said ground wheel.

18 Claims, 6 Drawing Figures

PROPULSION MEANS FOR WHEELCHAIRS

BACKGROUND OF THE INVENTION

For persons having disabilities which make walking difficult or impossible, a wheelchair has long provided an effective means of transportation. While the wheelchair and occupant may be assisted by a third party, it is more desirable to provide means whereby the occupant may propel himself independently.

The art of providing such means for independent transportation dates back at least before the turn of the century. See for example U.S. Pat. No. 287,789 granted to Arbogast on Nov. 6, 1883, in which the ground wheels of a wheelchair are driven by a chain which is also connected to a hand crank. The chain provides a smooth linkage between the hand crank and the ground wheel; however, to attain the leverage desirable for easy operation, the hand crank must extend to an awkward length.

Later art shows that the desired leverage is achieved if a drive lever, reciprocated by the pumping motion of the occupant's hand and arm, is adapted to provide rotational force to a ground wheel. U.S. Pat. No. 654,986 to Krueger, granted July 31, 1900, and U.S. Pat. No. 838,228 to Williams, granted Dec. 11, 1906, are examples of such a transfer from oscillatory motion of a drive lever to rotational motion of a ground wheel. In these devices, forward motion of the drive lever causes it to engage with drive gears which propel the ground wheel forward. Two problems inherent in the devices are: (1) that for each forward stroke with produces motion there is a rearward return stroke with produces no motion in the wheel, i.e. a "wasted return stroke"; and (2) that the required meshing action of gear teeth produces friction and is a drain on efficiency.

An attempt to produce rotary motion with the return stroke as well as the forward stroke of the drive lever is seen in U.S. Pat. No. 2,547,600 granted to Saxer Apr. 3, 1951, concerning a device designed for propelling a bicycle wheel using the handle bar. A chain connects the bicycle wheel sprocket to a driving sprocket proximate to the handle bar, and reciprocation of the handle bars results in forward movement of the front wheel. Operation of the driving unit is nonetheless still dependant upon the meshing action of gear teeth.

Much simpler systems eliminate the need for the meshing action of gear teeth. See for example U.S. Pat. No. 2,130,426 granted to Henderson Sept. 20, 1938, and U.S. Pat. No. 3,301,574 to Good granted Jan. 31, 1967, both of which involve frictional contact between a drive lever and the perimeter of a ground wheel when the drive lever is pushed in a forward direction. Of course, only the forward stroke produces motion in the wheel and the return stroke is useless.

Cam and follower arrangements are an attempt to eliminate both problems mentioned in connection with Krueger and Williams. Such arrangements are shown in U.S. Pat. No. 1,876,700 granted to H. Lee on Sept. 13, 1932, which shows a mobile kitchen chair; U.S. Pat. No. 3,053,550 to Kunsch et al. on Sept. 11, 1962; and U.S. Pat. No. 3,666,292 granted to Bartos on May 30, 1972. In these systems a follower linked to the drive lever drives a cam linked to the ground wheel axle. There are a number of inherent weaknesses to these systems due to the geometry of the cam and follower arrangement. In the rotation of every cam are two points at which the line of force as applied through the follower passes directly through the center of rotation of the cam. At these points, there can be no tangential force applied to the cam, regardless of the amount of lineal force applied to the follower. This problem is recognized in the Kunsch patent, wherein these points are referred to as "dead centers". Another weakness of the cam and follower system is that the length of the drive lever stroke is defined by the geometry of the arrangement. Consequently, a return stroke of the drive lever cannot be initiated until the forward stroke of the drive lever is completed; otherwise, the ground wheel would be forced to rotate in a reverse direction. Therefore, the size of the required drive stroke cannot be adjusted to accommodate different wheelchair occupants.

U.S. Pat. No. 2,946,602 granted to R. Lee on July 26, 1960, shows a hand-operated wheel linked to the ground wheel by means of a chain. The Lee system is similar to that shown in Arbogast in that it lacks the leverage gained by systems which translate oscillatory motion to rotational motion. U.S. Pat. No. 3,563,568 to Sasse granted Feb. 16, 1971, shows a wheelchair drive which is simply a hand rim provided along the perimeter of the ground wheel, and is an example of the use of a variable ratio gear system in a wheelchair drive.

SUMMARY OF THE INVENTION

This invention relates to a drive mechanism for wheelchairs which is particularly well suited for wheelchair occupants having full use of hands and arms. At each side of a wheelchair is a drive lever which is pumped by hand. Said drive lever engages with an axle to reciprocate said axle about its longitudinal axis. Oscillatory motion of the axle is translated to unidirectional rotational motion in a ground wheel. When forward motion of the wheelchair is desired, both drive levers are reciprocated simultaneously. If a right turn is desired, only the left drive lever is manipulated, the converse being true if a turn to the left is desired.

A drive assembly at each side of the wheelchair includes a drive lever and an axle, said drive lever capable of rigidly engaging with said axle so that oscillatory motion of the drive lever produces oscillatory rotational movement in the axle about its center. Mounted on the axle are two overrunning clutches. A first clutch engages and is moved by the axle whenever the axle rotates in a clockwise direction. A second clutch engages and moves with the axle whenever the axle is rotated in a counterclockwise direction.

A chain joins the first clutch with the hub of the ground wheel through a direct linkage, while joining the second clutch to the first clutch and ground wheel through a reverse bend. Consequently, clockwise rotation in the first clutch causes clockwise rotation in the ground wheel, while counterclockwise rotation in the second clutch also causes clockwise rotation in the ground wheel. Therefore, both the forward stroke and the return stroke of the drive lever generate forward rotation in the ground wheel.

Because this system translates the oscillatory motion of the drive lever to rotational motion in the ground wheel, it provides leverage not available in non-reciprocating systems. This makes the system easier physically to operate. The system is also efficient since the need for meshing action of gear teeth has been eliminated.

Both clutches operate regardless of the angle of the drive lever, meaning that there is no set length of forward stroke required before the return stroke of the drive lever may be initiated. This structure is therefore adaptable to a variety of sizes in wheelchairs and in wheelchair occupants. Another advantage of the system is the elimination of dead centers. Starting the wheelchair is accomplished with equal ease regardless of the position of the drive lever. A plunger mechanism is provided whereby the drive lever may be disengaged from the axle if it is desired that the ground wheel rotate free from the drive mechanism.

Caliper brakes are mounted proximate to the ground wheel, and are operable by hand from the drive lever by means of a lever and cable linkage. Similarly, a cable shift mechanism is mounted in the hub of the ground wheel, said shift mechanism similar to that found in three-speed bicycles. The shift mechanism is also operable from the drive lever through a cable linkage.

DESCRIPTION OF THE PREFERRED EMBODIMENT

Figure 2:
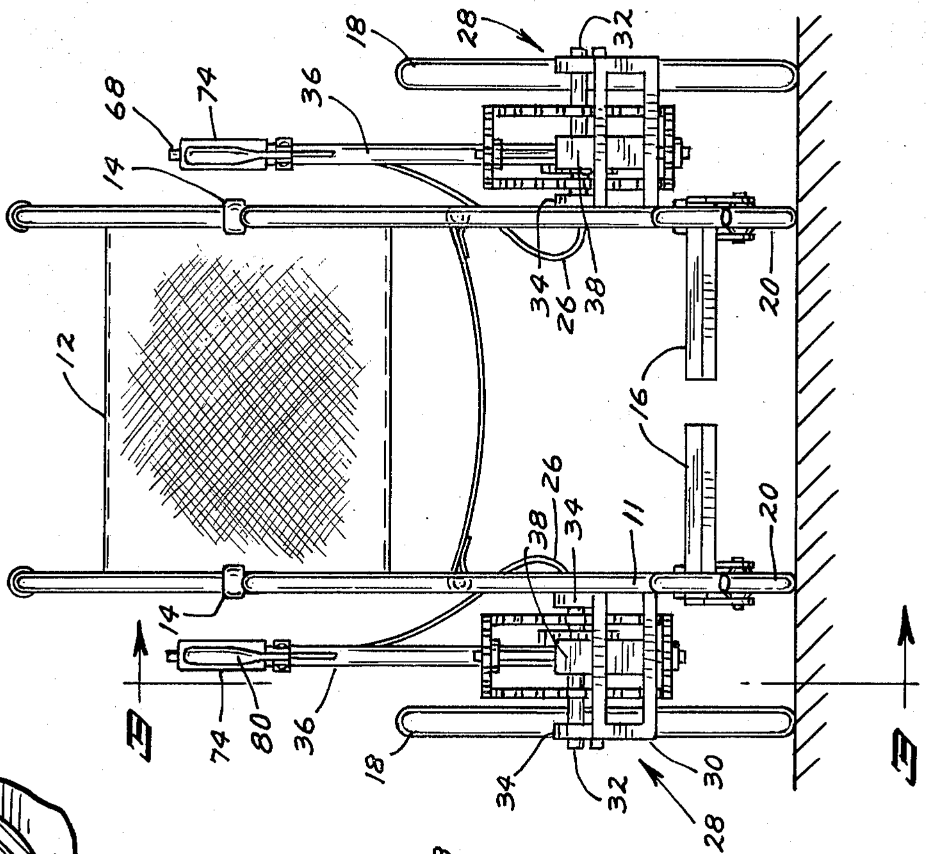
FIG. 2 is a front view of the wheelchair of FIG. 1 showing two drive assemblies.
Figure 6:
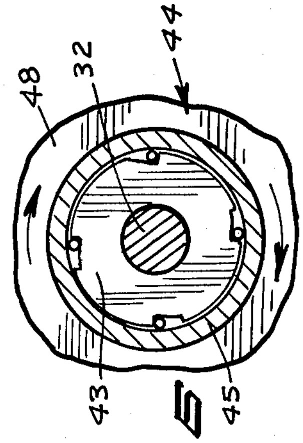
FIG. 6 is an enlarged fragmentary sectional view on line 6—6 in FIG. 5.
Figure 1:
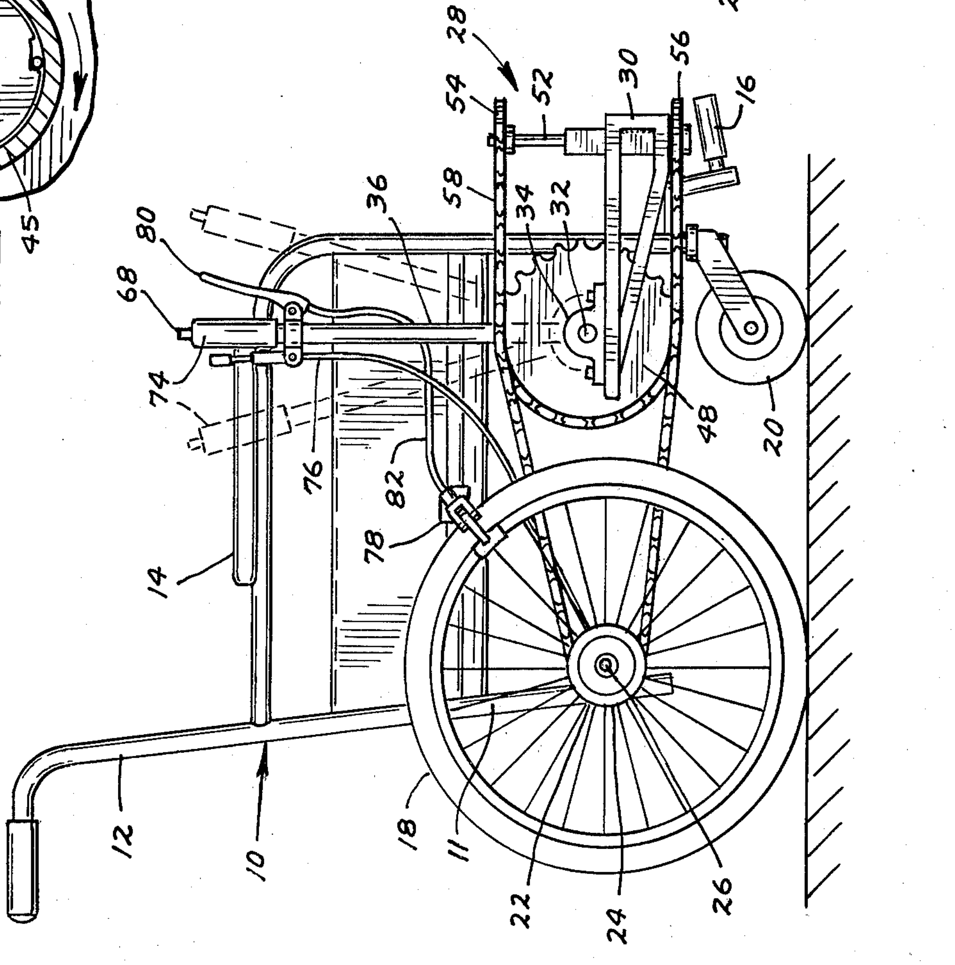
FIG. 1 is a side elevational view of a wheelchair and drive assembly of the present invention.

FIGS. 1 and 2 show generally a wheelchair 10 having a wheelchair frame 11 including a back 12, armrests 14, 14 and foot rests 16, 16. Ground wheels 18, 18 and caster wheels 20, 20 support wheelchair 10. A hub 22 in each ground wheel 18 contains a wheel sprocket 24 and a cable shift mechanism 26, preferably of a type commonly found in three-speed bicycles. A drive assembly 28 is mounted on wheelchair 10 forward of each ground wheel 18 at each side of wheelchair 10.

Figure 5:
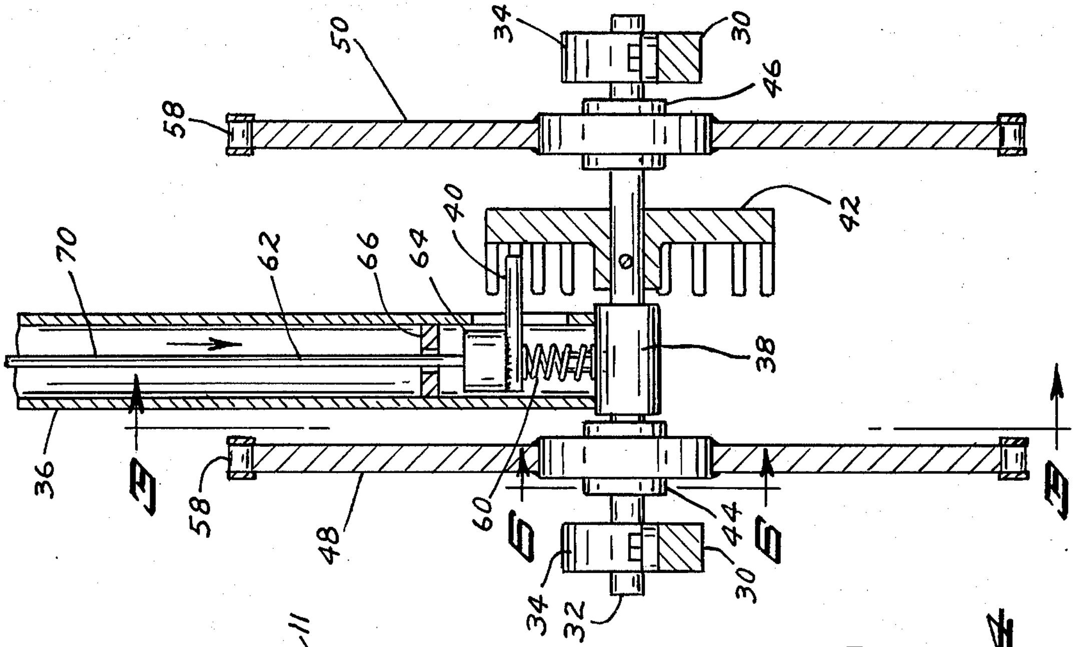
FIG. 5 is an enlarged cross sectional view as seen along the line 5—5 in FIG. 3.
Figure 4:
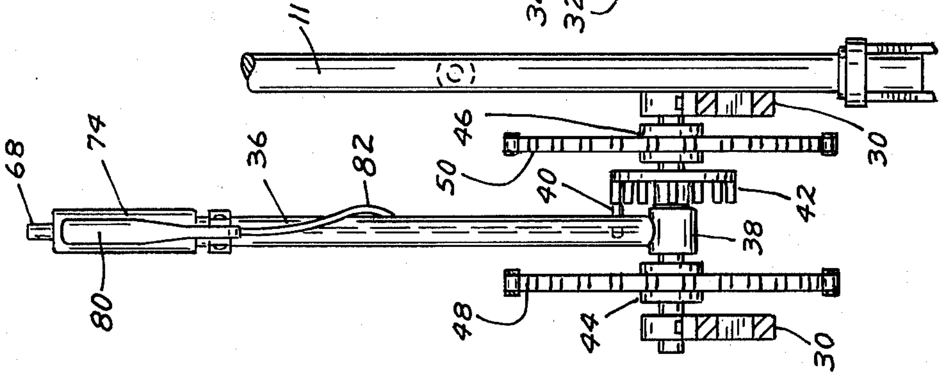
FIG. 4 is a cross sectional view as seen along the line 4—4 in FIG. 3.
Figure 3:
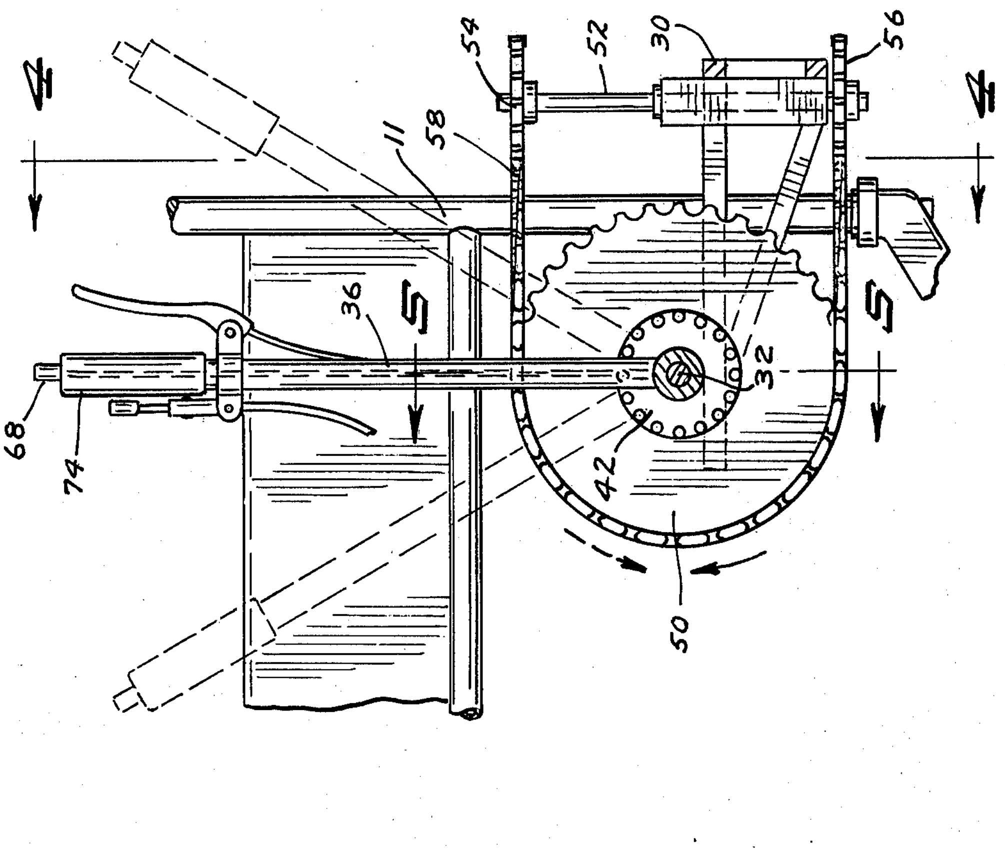
FIG. 3 is an enlarged fragmentary cross sectional view as seen along the line 3—3 in FIG. 2.

The embodiment is illustrated in further detail in FIGS. 3–5. Each drive assembly 28 is housed in a drive assembly frame 30 forming an integral part of wheel chair frame 11. A drive axle 32 is rotatably mounted on frame 30 through axle bearings 34, 34. In turn, a drive lever 36 is freely rotatably mounted on axle 32 through a bearing 38. Drive lever 36 is normally angularly fixed in relationship with axle 32 by a pin 40 on drive lever 36 which removably engages a crown gear 42 that is rigidly attached to axle 32.

As shown, an upper end of drive lever 36 including a drive lever grip 74 is within easy reach of the hand or arm of a wheelchair occupant. It is to be understood that the drive lever 36 could be so positioned that it could be operated by an extremity of the occupant other than a hand or arm; for example, by a leg or foot in a case where use of one or both of the occupant's arms is impaired.

Also mounted upon axle 32 are a first clutch 44 and a second clutch 46, each preferably an overrunning type clutch. First clutch 44 has a first driving element 43 which is rigidly attached to axle 32, and a second driven element 45 which is free to rotate relative to axle 32 in the clockwise direction as seen in FIGS. 1 and 3 but prevented from rotating relative to axle 32 in the counterclockwise direction. Similarly, second clutch 46 has a first driving portion rigidly attached to axle 32; and a second driven portion permitted to rotate freely only in the counterclockwise direction relative to axle 32.

A first drive sprocket 48 is rigidly attached to the driven element of first clutch 44. Likewise, a second drive sprocket 50 is rigidly attached to the driven portion of second clutch 46. It follows that rotation of axle 32 in the clockwise direction, shown by the solid arrow in FIG. 3, will cause clockwise rotation of first drive sprocket 48 while second drive sprocket 50 remains free to rotate counterclockwise with respect to axle 32. Similarly, counterclockwise rotation of axle 32, shown by the dotted arrow in FIG. 3, will leave first drive sprocket 48 free to rotate clockwise with respect to axle 32, but will cause second drive sprocket 50 to rotate counterclockwise.

A standard 52, rotatably mounted on frame 30, supports an upper idler sprocket 54 and a lower idler sprocket 56. A chain 58 is guided by wheel sprocket 24, first drive sprocket 48, second drive sprocket 50, upper idler sprocket 54 and lower idler sprocket 56. Chain 58 forms a reverse bend around upper idler sprocket 54 and a lower idler sprocket 56. Consequently, forward longitudinal motion of chain 58 along the top of first drive sprocket 48 causes rearward longitudinal motion of chain 58 along the top of second drive sprocket 50. There is a similar opposition in longitudinal movement of chain 58 along the bottom portions of first drive sprocket 48 and second drive sprocket 50, respectively. Forward longitudinal movement of chain 58 along the top of first sprocket 48 will necessarily produce rearward longitudinal movement of chain 58 along the bottom of first drive sprocket 48; likewise, as to second drive sprocket 50. From the above it is seen that any movement of chain 58 which produces a clockwise rotation in first drive sprocket 48 causes second drive sprocket 50 to rotate in a counterclockwise direction.

An occupant propels wheelchair 10 by pumping drive lever 36 while pin 40 is engaged with teeth of crown gear 42, which produces reciprocal axial motion in axle 32. As seen in FIGS. 1 and 3, forward movement of drive lever 36 produces clockwise rotation in axle 32, which causes first clutch 44 to engage and force first drive sprocket 48 to rotate in the clockwise direction. A clockwise rotation in first drive sprocket 48 forces the upper portion of chain 58 in a forward longitudinal direction. Movement of chain 58, in turn, causes clockwise rotation of wheel sprocket 24 as seen in FIG. 1.

Second drive sprocket 50 is forced to rotate counterclockwise by chain 58. Such counterclockwise rotation is permitted by second clutch 46 which remains disengaged as long as rotation of second drive sprocket 50 with respect to axle 32 is counterclockwise.

Rearward movement of drive lever 36 causes counterclockwise rotation in axle 32. Such rotation of axle 32 causes second clutch 46 to engage, which in turn forces second drive sprocket 50 to rotate in the counterclockwise direction. The portion of chain 58 along the top of second drive sprocket 50 is then forced in a rearward longitudinal direction. Due to the aforementioned reverse bend, the portion of chain 58 along the top of first drive sprocket 48 is pulled in the forward longitudinal direction, producing clockwise rotation of wheel sprocket 24 and, consequently, ground wheel 18. First clutch 44 remains disengaged, allowing first drive sprocket 48 to rotate freely in the clockwise direction with respect to axle 32. In the above described manner, reciprocal motion of drive lever 36 is transferred to smooth and continuous rotational motion in wheel sprocket 24.

The engaged relationship between axle 32 and drive lever 36 is maintained by a compressed coil spring 60 which forces pin 40 and a plunger 62 radially outward from bearing 38 until a plunger head 64 abuts a detent member 66. Detent member 66 is so positioned in drive lever 36 that said abutment and the engaging of pin 40 with teeth of crown gear 42 will coincide, as seen in FIG. 4.

Drive lever 36 may be disengaged from axle 32 by a button 68 which is rigidly connected to a plunger rod 70 and extends above the top of drive lever 36. When button 68 is pressed, plunger rod 70, plunger head 64, and pin 40 will be displaced downward until pin 40 becomes disengaged from the teeth of crown gear 42, as seen in FIG. 5. This disengaged position allows free rotational movement of axle 32 with respect to drive lever 36. When button 68 is released, coil spring 60 will again force plunger head 64 against detent member 66, causing reengagement of pin 40 with teeth of crown gear 42.

Returning to FIGS. 1 and 2, a wide range of traveling speeds is allowed in the present embodiment due to cable shift mechanism 26. Shift mechanism 26 is housed in hub 22 and is operable from the grip 74 of drive lever 36 through a shift cable 76 which may be adjusted by a twist of grip 74, manipulation of a lever or the like.

Wheel chair 10 is stopped by application of a caliper brake 78 mounted in a spaced relationship to ground wheel 18. Caliper brake 78 is operable from a brake lever 80 on drive lever 36 through a brake cable 82 connected to caliper brake 78.

Although only one drive assembly 28 has been described, it is seen from FIG. 2 that the preferred embodiment includes two drive assemblies 28, 28. Forward motion of wheelchairs 10 is achieved by simultaneous operation of drive levers 36, 36, while turning in either direction is achieved by reciprocating only one drive lever 36.

The embodiments of the invention in which an exclusive property or privilege is claimed are defined as follows:

1. The combination with a wheelchair having a supporting frame, and at least one caster wheel and two parallel, spaced apart ground wheels rotatably mounted with respect to said frame; of a first wheelchair drive assembly including:

- a drive axle rotatably mounted on a frame;
- means for rotating said axle alternatively in a first and in a second direction about its longitudinal axis;
- a first clutch having a first element mounted to rotate responsive to rotation of said drive axle and a second element concentrically mounted with respect to said first element, said second element engaging to rotate with said first element in a first direction whenever said axle is rotated in its first direction but being disengaged from said first element while said axle is not rotated in the first direction;
- a second clutch having a first portion mounted to rotate responsive to rotation of said drive axle and a second portion concentrically mounted with respect to said first portion, said second portion engaging to rotate with said first portion in a second direction whenever said axle is rotated in its second direction but being disengaged from said first portion while said axle is not rotated in the second direction;
- means for rotating a first ground wheel rotatably mounted with respect to said frame in a clockwise direction responsive to rotation of said second element in its first direction; and
- means for rotating said ground wheel in the clockwise direction responsive to rotation of said second portion in its second direction.

2. The drive assembly of claim 1 wherein there is a linear relationship between the angular movement of the drive axle and angular driven clockwise movement of the ground wheel.

3. The drive assembly of claim 1 wherein the means for rotating said ground wheel in a clockwise direction responsive to rotation of said second element in its first direction and the means for rotating said ground wheel in the clockwise direction responsive to rotation of said second portion in its second direction includes:

- a ground wheel sprocket drivably associated with said ground wheel to rotate with rotation of said ground wheel;
- a first drive sprocket drivably associated with said second element to rotate with rotation of said second element;
- a second drive sprocket drivably associated with said second portion to rotate with rotation of said second portion;
- a chain drivably connecting the ground wheel sprocket with the first drive sprocket and the second drive sprocket in such a manner that rotation of said second element in its first direction and rotation of said second portion in its second direction both result in said ground wheel being rotated in a clockwise direction.

4. The drive assembly of claim 3 wherein the means for rotating said ground wheel includes two chain idler sprockets rotatably mounted on said frame in meshing relation to said chain to form a reverse bend in said chain; and wherein said first and second drive sprockets are drivingly associated with said chain and the reverse bend in such chain to drive the chain in a single forward direction responsive to first direction rotation of said second element and second direction rotation of said second portion.

5. The combination of claim 3 and a second such drive assembly drivingly associated with a second ground wheel which is parallel with said first ground wheel and rotatably mounted with respect to said frame.

6. The first and second drive assemblies of claim 5 wherein the means for rotating each of the axles of each of said drive assemblies alternatively in a first and in a second direction includes two separate manually operable drive levers, each pivotally mounted with respect to one of said axles and normally fixedly engaged with respect thereto, each of said drive levers extending to position to be effectively accessible to an extremity of a person occupying said wheelchair.

7. The drive assemblies of claim 6, and means for disengaging each drive lever from its axle so its axle may rotate freely with respect thereto.

8. The drive assemblies of claim 7, wherein said means of disengaging each of said drive levers is associated with that lever in position to be manually operable during manual manipulation of such lever to rotate said axle.

9. The drive assemblies of claim 8 and brake assemblies, one manually controllable from each of said drive levers during manual operation of said disengaging means to tend to stop rotation of its associated ground wheel with respect to said frame.

10. The drive assembly of claim 1 wherein the means for rotating said axle alternatively in a first and in a second direction about its longitudinal axis includes a manually operable drive lever pivotally mounted with respect to said axle and normally fixedly engaged with respect thereto and extending to position to be effectively accessible to an extremity of a person occupying said wheelchair.

11. The combination of claim 10 and a second such drive assembly drivingly associated with a second ground wheel which is parallel with said first ground wheel and rotatably mounted with respect to said frame.

12. The drive assembly of claim 10, and means for disengaging said drive lever so that said axle may rotate freely with respect thereto.

13. The drive assembly of claim 12 wherein said means of disengaging said drive lever is associated with said lever in position to be manually operable during manual manipulation of said lever to rotate said axle.

14. The combination of claim 13 and a second such drive assembly drivingly associated with a second ground wheel which is parallel with said first ground wheel and rotatably mounted with respect to said frame.

15. The drive assembly of claim 13 and a brake assembly manually controllable from said drive lever during manual operation of said disengaging means to tend to stop rotation of said ground wheel with respect to said frame.

16. The combination of claim 15 and a second such drive assembly drivingly associated with a second ground wheel which is parallel with said first ground wheel and rotatably mounted with respect to said frame.

17. The combination of claim 1 and a second such drive assembly drivingly associated with a second ground wheel which is parallel with said first ground wheel and rotatably mounted with respect to said frame.

18. The combination of claim 17 wherein one of said drive assemblies is associated with a left side of said wheelchair and one of said drive assemblies is associated with a right side of said wheelchair, both being positioned so that one of said drive levers is effectively accessible to a first extremity of a person occupying the wheelchair and the other of said drive levers is effectively accessible to a second extremity of such person.

* * * * *